March 30, 1954   F. D. SAWYER ET AL   2,673,440
CROP STRIPPING MEANS
Filed April 18, 1952
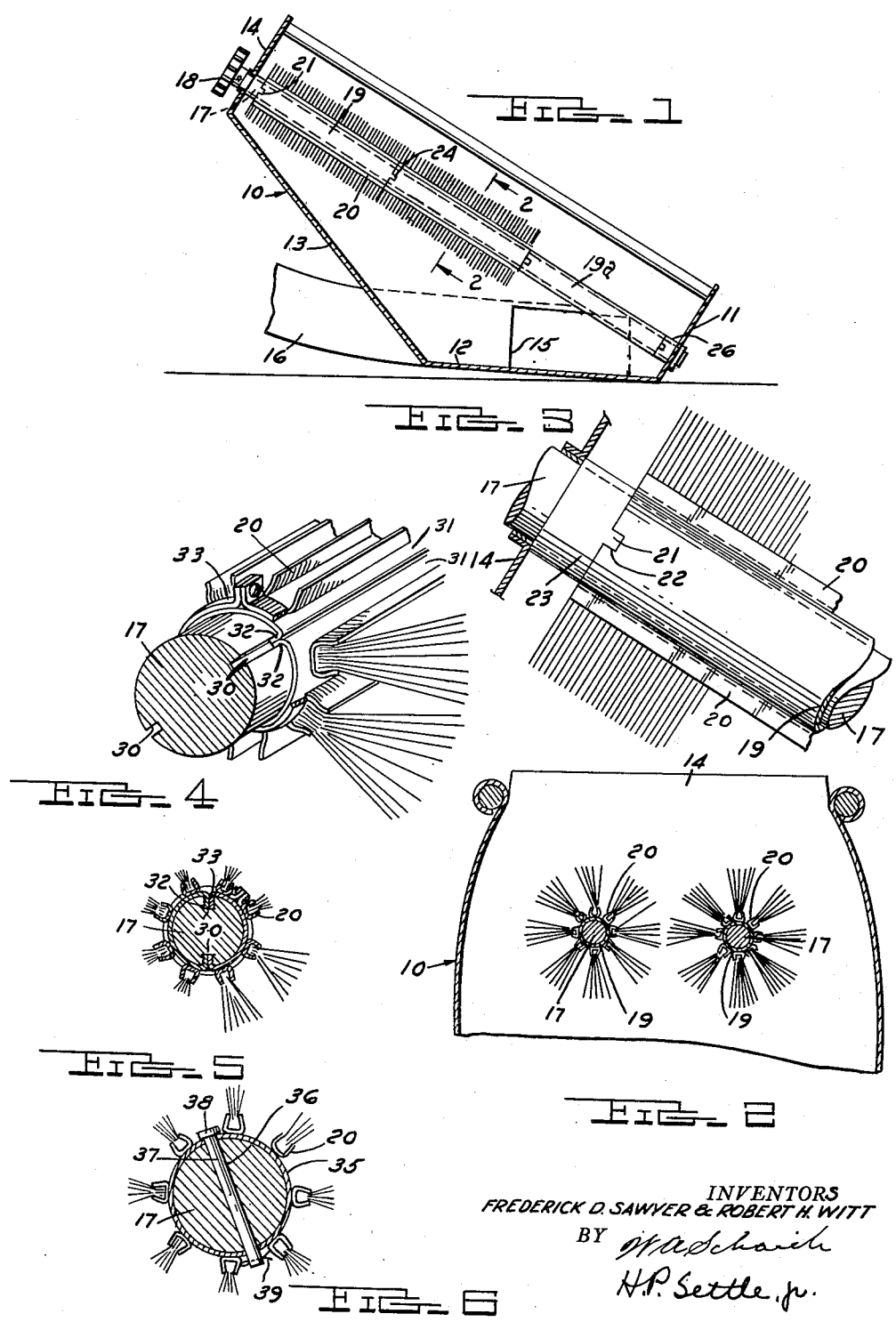
INVENTORS
FREDERICK D. SAWYER & ROBERT H. WITT
BY
ATTORNEYS Patented Mar. 30, 1954

2,673,440

UNITED STATES PATENT OFFICE 2,673,440

CROP STRIPPING MEANS

Frederick D. Sawyer, Birmingham, and Robert H. Witt, Royal Oak, Mich., assignors, by mesne assignments, to Ford Motor Company, Dearborn, Mich., a corporation of Delaware Application April 18, 1952, Serial No. 282,952

3 Claims. (Cl. 56—33)

The present invention relates to a crop stripping means and more particularly to a crop stripping brush adaptable for use with a stripper-type harvesting machine.

It has been proposed that cotton and similar crops be harvested by the utilization of counter-rotating stripping brushes defining a restricted stripping nip therebetween into which the plant is introduced so that the crop is stripped therefrom by the brush action. One of the most serious problems encountered in the harvesting of cotton is the lack of simultaneous maturing of the entire crop upon any given plant, i. e., the bolls on the lower branches mature a considerable time before maturation of the bolls on the upper portions of the plant. Consequently, in the harvesting of cotton by hand, each plant is picked several times during the season. It is impossible to selectively pick or strip cotton by the employment of the conventional cotton picking or stripping mechanism, so that the cotton is stripped, if possible, at a time when the majority of the bolls are fully mature, but some of the remaining bolls are immature and the earliest maturing bolls are beyond their quality peak. The possibilities of serious loss of yield and grade quality in the stripped crop will be appreciated.

The present invention provides cotton stripping brushes which are composed of a plurality of axially aligned brush sections disposed upon a shaft for corotation with one or more of the sections of each brush being removable. In this manner, the upper portions of the brush may be removed, so that only the early maturing lower bolls are stripped, while later in the season the lower brush sections are removed, and the bolls upon the upper part of the plant only are removed without interference from weeds or stalks at the lower plant portions. In this manner selective stripping of the cotton at full maturity is possible by the use of mechanical harvesting means.

It is, therefore, an important object of the present invention to provide an improved crop stripping mechanism adaptable for the selective harvesting of a crop.

Another important object is the provision of a crop stripping brush which may be utilized to strip a specific portion only of a plant, so that the crop may be harvested as it matures.

It is a further important object to provide an improved crop stripping brush for the harvesting of cotton including a plurality of corotatable axially aligned brush sections, the sections being individually removable without interrupting a co-rotation of the remaining sections, so that only a pre-selected portion of the plant is subjected to the stripping action of the brushes.

Still another important object is the provision of a crop stripping brush for a cotton harvester including a plurality of axially aligned stripping brush sections adaptable to provide a brush of varying length and bristle location which may be utilized to harvest only a selected portion of a plant.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a fragmentary side elevational view, with parts broken away and in section, illustrating a cotton harvester provided with a stripping brush of the present invention;

Figure 2 is a fragmentary enlarged sectional view taken along the plane 2—2 of Figure 1;

Figure 3 is a greatly enlarged fragmentary elevational similar to Figure 1 and illustrating in greater detail the crop stripping brush construction;

Figure 4 is an enlarged fragmentary perspective view of a modified form of stripping brush;

Figure 5 is an end view with parts broken away and shown in section of the brush of Figure 4; and Figure 6 is an end view, with parts broken away and shown in section of another modified form of stripping brush.

As shown on the drawings:

In Figure 1 reference numeral 10 refers generally to a stripper-type harvesting machine particularly adapted for the harvesting of cotton and generally similar to that fully described in the copending applications of Robert H. Witt, Serial Numbers 240,565, now abandoned, and 240,566, filed August 6, 1951, and assigned to the assignee of the present invention. The harvesting machine 10 comprises generally a harvesting head including an upstanding front wall 11, a lower wall 12, an upwardly and rearwardly inclined rear wall 13, and an unstanding back wall 14 generally parallel to the front wall 11. The harvesting head is provided with an intake opening 15 in full communication with a suction intake conduit 16 adapted to receive the harvested cotton therethrough and forming a portion of the conveying means for carrying the cotton to a suitable receptacle.

The spaced front and rear walls 11 and 14 respectively journal the extreme portions of a longitudinally extending shaft 17 adapted to be rotatably driven by suitable means, as by a sprocket 18 secured to the shaft and driven by the harvester prime mover. The shaft 17 is adapted to telescopically receive thereover a plurality of axially extending tubular sections 19, each section bearing upon its outer periphery a plurality of circumferentially spaced, longitudinally extending U-shaped bristle brush backing strips 20. The backing strips or channels 20 are welded or otherwise fixedly secured to the outer surface of the tubular sections 19 and extend radially of the sections and of the associated shafts 17.

The tubing sections are corotatable with the shafts 17 by means of cooperating longitudinally extending lugs 21 projecting radially from the shaft and enterable within correspondingly shaped recesses 22 formed in the tube sections 19 at one axial end thereof. The lug 21 on each shaft 17 is formed as a portion of a radially enlarged collar 23 against which the uppermost tube section 19 is bottomed so that the lug 21 projects into the associated recess 22. One axial end of each tube section 19 is provided with the recess 22 while the opposing axial end is provided with a lug 24 adapted for insertion into the recess 22 of the next adjacent section. The lugs 21 and 24 serve to maintain driving relation between the individual tube sections 19 and the shaft 17, and the lower terminal end of the shaft is provided with a tubular spacer 26 adapted to abut the forward end of the lowermost tubing section.

If it is desired to employ only the two lowermost tubing sections 19, an elongated tubular spacer 19a is interposed between the shaft collar 23 and the next adjacent section, this collar being provided with a lug 21 for engagement with the recess 22 of this next adjacent section. On the other hand, if it is desired that only the two uppermost sections be utilized, the tubular spacer 19a of a length equal to the spacer 26 plus the length of the lowermost tubing section is utilized to retain the upper two sections in their desired positions. It will be appreciated that although three tubular sections 19 have been illustrated, any number of such sections may be employed.

In the embodiment of Figures 4 and 5, the shaft 17 is provided with axially extending peripheral recesses 30 which are illustrated as being directly opposed, i. e., to lie on opposite sides of the shaft. The bristle brush backing strips 20 are rigidly secured, as by welding, to a pair of semicircular backing sections 31 which terminate in inturned radially extending flanges 32 enterable into the slots 30. The slots are of such width as to accommodate the entry of the abutting flanges 32 after the semicircular strips 31 have been sprung sufficiently to allow the flanges to pass over the shaft. The strips 31 are of less length than the shafts 17, so that the same advantages of brush arrangement described in connection with Figures 1-3 are obtained.

To secure the sections even more securely to the shaft 17, the backing strip sections 20 are spaced slightly from the axial ends of the sections 31 so that a peripheral band 33 is employed to surround the sections 31 and to clamp the same securely to the shaft. Driving relation between the shaft 17 and the sections 31 thereon is maintained by engagement of the flanges 32 within the slots 30 and the bands 33 merely serve to retain the sections 31 in position.

Still another modified form of brush is illustrated in Figure 6. Here again the brush backing strips 20 are welded or otherwise rigidly secured to a tubing section 35 which is telescopically mountable upon the associated shaft 17. The shaft is provided with a radially extending aperture 36 within which is positioned a securing pin 37. The pin 37 is provided with an enlarged head 38 which abuts the exterior surface of the tube, while a cotter key 39 is secured to that opposite end of the pin which projects through the sleeve 35 and the shafts 17 to secure the pin in position. The pin 37 extending through the shaft and registering apertures in the sleeve secures the two elements together, both for corotation and against axial movement.

The tubing sections 35 are employed in the same manner as the sections 19 heretofore described in connection with Figures 1-3 inclusive.

It will be appreciated that the present invention thus provides an extremely simple, inexpensive and readily employed crop stripping brush or the like which may be employed to selectively strip a crop, such as cotton or the like, from only a portion of the associated plant. In this manner, hand harvesting of the crop may be most closely simulated. Each of the three embodiments of the present invention provide for the selective utilization and arrangement of axially aligned brush sections in this manner.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a harvesting machine having a stripping nip, a pair of rotatable stripping brushes defining said nip and each comprising a rotatable brush spindle having an axially extending groove in the periphery thereof, and an arcuate inherently resilient brush member adapted to extend axially of said spindle and having an inturned longitudinally extending terminal lip enterable in said groove upon springing the resilient member to pass over said spindle, said cooperating lip and groove securing said member to said spindle against relative rotational movement while accommodating relative axial adjustment of said member.

2. In a harvesting machine having a stripping nip, a pair of rotatable stripping brushes defining said nip and each comprising a rotatable brush spindle having a pair of circumferentially spaced axially extending grooves in the periphery thereof, a pair of semi-cylindrical brush members of an axial length substantially less than that of said spindle and having inturned terminal lips thereon entered in said grooves, and clamping means encircling said spindle and urging said brush members thereagainst, said cooperating lip and groove, together with said clamping means, securing said member to said spindle against relative axial and rotational movement while accommodating relative axial adjustment of said member.

3. In a harvesting machine having a stripping nip, a pair of rotatable stripping brushes defining said nip and each comprising a rotatable brush spindle having an axially extending groove formed in the periphery thereof, a pair of generally semi-cylindrical brush members of an axial length substantially less than that of said spindle and each having a radially inturned terminal lip entered in said groove, the combined thicknesses of said lips being slightly less than the circumferential extent of said groove, and clamping means encircling a portion of said brush members to urge the same radially against said spindle and to retain said lips in said groove.

FREDERICK D. SAWYER.
ROBERT H. WITT.

References Cited in the file of this patent

UNITED STATES PATENTS

| Number | Name | Date |
|---|---|---|
| 991,876 | Murray | May 9, 1911 |
| 1,370,257 | Adams | Mar. 1, 1921 |
| 1,731,717 | Friend | Oct. 15, 1929 |
| 2,146,624 | Cave | Feb. 7, 1939 |

FOREIGN PATENTS

| Number | Country | Date |
|---|---|---|
| 418,178 | Great Britain | Oct. 19, 1934 |